Aug. 22, 1961 J. G. ISABEAU 2,997,603

TRANSISTOR CONTROL SYSTEM

Filed Oct. 28, 1958

INVENTOR
Jean G.V. Isabeau
BY Hugh H. Drake
ATTORNEY

United States Patent Office 2,997,603
Patented Aug. 22, 1961

2,997,603
TRANSISTOR CONTROL SYSTEM
Jean G. Isabeau, Lombard, Ill., assignor to Zenith Radio Corporation, a corporation of Delaware
Filed Oct. 28, 1958, Ser. No. 770,191
2 Claims. (Cl. 307—88.5)

The present invention relates to a signal limiter. In particular, the invention is directed to a signal limiter especially suitable for transistorization.

Numerous signal limiter circuits are known to the art and find utility in a variety of systems in which it is desired to prevent the amplitude of a signal from exceeding a predetermined level on signal swings of either one or both polarities. It is customary to utilize a limiter ahead of a discriminator responsive to frequency modulation in order to reject undesired amplitude modulation which may also be present on the incoming signal. Limiters have also found beneficial usage in control systems in which it is desired to operate a device only in response to a signal of sustained duration while being unresponsive to transient noise; for example, such systems may include an integrating network to measure the duration of the incoming signal, the limiter being employed to prevent actuation in response to integration of short-duration high-amplitude pulses.

Of the many limiters thus far developed, a substantial number depend upon characteristics peculiar to special electron discharge devices for their operation. This kind of limiter necessarily is unsuitable for use in transistorized systems. With regard to limiter circuits suitable for using a transistor, the most common are those which depend upon saturation of the current characteristic of the device to cause the output signal to limit or level off in amplitude. Saturation limiters are unsuitable in a large body of applications because of their essential dependence upon the characteristics of the active device itself. These characteristics in transistors not only vary over substantial ranges within each production lot but are in addition subject to variation with age and temperature. Other limiters capable of performing with a transistor as the active device suffer from such deficiencies as complexity or difficulty of maintaining adjustment, excessive cost, or dependence upon some characteristic peculiar to a special transistor construction and not readily obtainable from conventional transistors.

It is the general object of the present invention to provide a limiter which overcomes the above noted disadvantages.

It is another object of the present invention to provide a limiter which requires but a few components of readily available and conventional types.

A further object of the present invention is to provide a limiter which may be easily constructed to meet a host of applications.

Still another object of the present invention is to provide a limiter which is characterized by ease and stability of adjustment.

In accordance with one feature of the invention, the limiter includes input and output circuits with a signal source in the input circuit and a load in the output circuit across which a voltage is developed in response to signal energy. A feedback path extends from the output circuit to the input circuit and includes a Zener diode type element in series with a gating device conductive of the signal energy when the voltage exceeds a predetermined finite level. The limiter also includes means for biasing the gating device non-conductively at values of the voltage less than the predetermined level.

According to another feature of the invention, the limiter includes a first load in the output circuit resonant to signal energy from the source and a second load therein, in series with the first load, presenting an impedance non-resonant to the signal energy and across which a voltage is developed in response thereto. A feedback channel is coupled at one end across the non-resonant impedance and at its other end into the input circuit. The limiter further includes a threshold device in the feedback path responsive to values of the voltage tending to exceed a predetermined limit in order to maintain the voltage at that limit.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like reference numerals refer to like elements in the several figures, and in which:

Figures 1, 2, 2A, 3, 4:
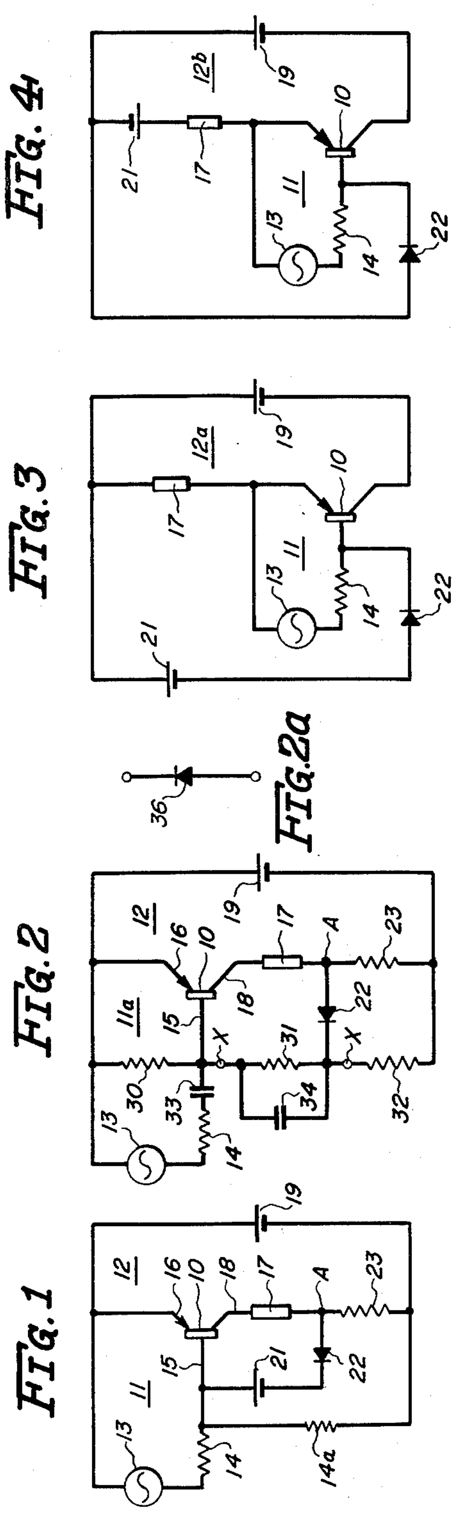
FIGURE 1 is a schematic diagram of one embodiment of the present invention.
FIGURE 2 is a schematic diagram of another embodiment of the present invention.
Figure 5:
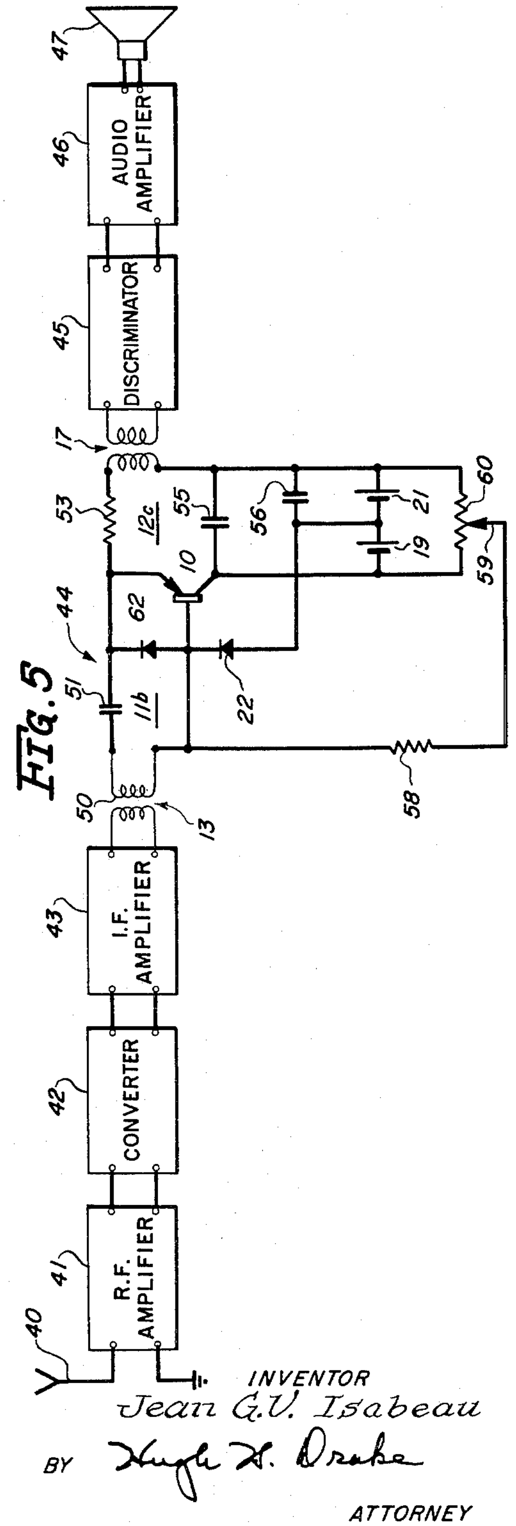

FIGURE 2*a* depicts an alternative portion of the embodiment illustrated in FIGURE 2;

FIGURE 3 is a schematic diagram of a further embodiment of the present invention;

FIGURE 4 is a schematic diagram of still another embodiment of the present invention; and FIGURE 5 is a schematic diagram of a radio receiver incorporating an embodiment of the present invention.

In the embodiment of the invention illustrated in FIGURE 1, an amplifier 10 has an input circuit 11 and an output circuit 12. A signal source 13 in series with the usual schematic signal source impedance 14 is included in input circuit 11 to apply input signals across the input electrode 15 and common electrode 16 of amplifier 10. A load 17 in output circuit 12 is coupled through the output circuit across an output electrode 18 and common electrode 16 of amplifier 10. Also included in output circuit 12 is a supply source 19 for energizing amplifier 10. In this instance, amplifier 10 is a PNP transistor with input source 13 coupled between base 15 and emitter 16 and load 17 coupled between emitter 16 and collector 18. Supply source 19 is polarized to bias collector 18 negatively with respect to emitter 16, the circuit as thus far described therefore being that of a conventional transistor amplifier operating in the common-emitter mode. A resistor **14*a* preferably is coupled between base 15 and the negative terminal of source 19** to establish proper operating bias on the transistor.

The invention contemplates a feedback path coupling the input and output circuits with means therein including a threshold device responsive to values of a voltage developed in load circuit 12 tending to exceed a predetermined limit for maintaining that voltage at that limit. To this end, a potential source 21 and a gating device in the form of a diode 22 are included in the feedback path. For developing the output circuit voltage to which diode 22 is responsive, an impedance in the form of a resistor 23 is included in output circuit 12 beyond load 17 from collector 18. In effect, load 17 and impedance 23 constitute first and second loads which together constitute the total load in output circuit 12. The end of diode 22 remote from source 21 is in this instance coupled to output circuit 12 at a point A intermediate load 17 and impedance 23 so that a gated signal-feedback loop is formed from collector 18 to base 15. Viewed from the overall circuit standpoint, diode 22 forms a part of and is included in a feedback channel coupled at one end across resistor 23 and at its other end into the input circuit.

The manner in which the feedback loop is gated is best understood by first assuming an absence of signal from input source 13. Under these conditions there is no output signal current and the voltage drop across impedance 23, simply a resistor in this case, is a constant determined by the quiescent transistor current corresponding to the bias conditions on the transistor. The potential level of source 21, tending to bias diode 22 conductively, is chosen so that the net bias on diode 22 is in a reverse or non-conductive direction by a predetermined amount; the feedback path is therefore effectively blocked.

With a signal applied from input source 13 increasing in a direction tending to increase current flow in the transistor, a voltage drop correspondingly appears across impedance 23 making point A increasingly more positive. When the voltage level as measured by diode 22 at point A exceeds the level of the potential of source 21, diode 22 becomes conductive whereupon the instantaneous positive signal level appearing at point A is applied to base 15 of the transistor. Consequently, the voltage at the input terminal of amplifier 10 is determined by the combined action of the signal of input source 13, and the feedback signal transferred through diode 22. A regulating action is performed by the feedback signal tending to counteract the action of the input signal to effectively limit to a selected level the positive excursions of the voltage at point A.

For the particular circuit in FIGURE 1, limiting by action of the feedback path occurs only on the particular polarity of input voltage swing causing a change of voltage at point A in a positive direction. The other polarity of input voltage swing is limited by action of the input circuit alone. That is, as the input voltage instantaneously varies in a direction tending to bias emitter 16 negatively with respect to base 15, amplifier 10 is effectively cut off when the magnitude of the voltage swing is sufficient to bias the emitter in a reverse direction with respect to the base. Thus, variation of the input signal in one direction, a swing of one polarity, is limited in magnitude at the level where the input voltage impresses a reverse bias between the input and common electrodes. On the other hand, limiting for input signal swings of the opposite polarity is achieved by the action of the threshold device in the feedback network. The particular level at which limiting occurs may be selected by variation of an input circuit bias supply, for signal peaks of one polarity, and by correlated variation of the potential level from source 21 and/or the value of impedance 23, for signal peaks of the other polarity.

When desired for certain applications, the feedback network may be coupled to output circuit 12 on the side of load 17 nearest collector 18, and impedance 23 may then be dispensed with. This is in some cases undesirable, however, inasmuch as load 17 must then be selected to match the characteristics of the feedback network as well as subsequent stages to which it is coupled. As illustrated, impedance 23 need only be a comparatively small resistor for the purpose of measuring the current level in the output circuit, but which in itself need dissipate only a small amount of power.

Preferably, output load 17 is a network highly resonant to the input signal frequency. In the arrangement of FIGURE 1, the voltage developed across load 23 is essentially a square wave, as a result of limiting, and the current through load 17 is therefore also a square wave. The voltage across resonant load 17 however is a sinusoidal output signal suitable for further processing such as transfer to a subsequent amplification stage or a discriminator. One important advantage of this arrangement becomes apparent; as the voltage variations across load 17 are large with respect to the voltage variations across resistor 23, the former may reach a level close to the voltage of battery 19, so that the limiter provides a maximum of power in a resonant load for a given transistor allowable dissipation.

In order to avoid the necessity of employing a separate potential source 21 in addition to supply source 19, a voltage divider bypassed in part may be employed as illustrated in FIGURE 2. The voltage divider includes resistors 30, 31 and 32 connected in series across supply source 19. Diode 22 is connected as before at one end to terminal A. Its other end is connected to the junction between resistors 31 and 32. The other end of voltage divider resistor 31 is connected to base electrode 15, a blocking condenser 33 being inserted in input circuit 11*a* to isolate source 13 from the voltage developed across resistor 31. Resistor 30 has a value high with respect to the emitter-base resistance to avoid shunting the input of amplifier 10. A capacitor 34 bridging resistor 31 serves to bypass signal frequency energy.

The operation of the embodiment illustrated in FIGURE 2 is essentially the same as that discussed above with regard to FIGURE 1, battery 21 of the latter being replaced by the potential developed across resistor 31. As before, diode 22 is biased non-conductively until signal energy in output circuit 12 develops a voltage drop across impedance 23 such as to overcome the bias potential presented across diode 22 at which time the signal energy level instantaneously appearing at point A is applied through the feedback path and capacitor 34 to base electrode 15.

While the arrangement illustrated in FIGURE 2 is suitable for most control applications, some variation in the limiting level may be observed in a practical circuit because of the tendency of bypass capacitor 34 to build up a charge and change the input circuit bias. That is, for signal levels sufficient to create a substantial feedback current, bypass capacitor 34 assumes a charge which in turn changes the bias on base 15. This occurs when the feedback path D.C. impedance is excessive. To overcome this situation where necessary, a special low voltage breakdown device 36 may be employed in place of resistor 31 and bypass capacitor 34. Such a device is illustrated in FIGURE 2*a* and is connected between terminals X—X in FIGURE 2 on either side of resistor 31. One suitable device for this purpose is the so-called "Zener" diode which has the property of presenting an impedance of low magnitude for applied voltages exceeding a predetermined threshold but presenting a high impedance of at least an order of magnitude greater at voltages below the threshold level. The Zener diode thus is biased to act essentially as a constant voltage device, and performs exactly the same function as battery 21 in FIGURE 1. There is no undesirable charging effect as described earlier with respect to capacitor 34.

Another modification of the invention is disclosed in FIGURE 3. As before, input circuit 11 is coupled between the input and common electrodes of amplifier 10, and output circuit 12*a* is coupled between the output and common electrodes as in a conventional transistor amplifier. In this instance, however, load 17 is located in the output circuit on the side of supply source 19 toward the common electrode, but not in the output circuit portion which is in common with the input circuit. The feedback path is coupled between the input or base electrode and a point in the output circuit on the side of load 17 between the latter and supply source 19. In this embodiment, potential source 21 in the feedback path is polarized in a direction tending to bias diode 22 against conduction. A small forward bias between base and emitter is generally desired to properly operate transistor 10 in FIGURE 3. Circuitry providing such bias has been omitted in FIGURE 3, but one example is described in conjunction with FIGURE 5. On the other hand, for half-wave limiting, such a bias arrangement is not required.

With no input from signal source 13, the reverse bias on diode 22 holds the feedback path open. Upon the application of signal energy to input circuit 11, resulting in conduction in the transistor, a voltage drop is developed across load 17 in a direction tending to bias feedback diode 22 in a conductive or forward direction. Until the level of this voltage drop exceeds the reverse diode potential, it is not applied across the input circuit of amplifier 10. Once the reverse-bias level is exceeded, however, device 22 conducts, placing the amplified signal voltage peak between the base and emitter electrodes of amplifier 10 with a polarity tending to decrease input signal current. A regulating action takes place in the same manner as the action described for the circuit of FIGURE 1 so that the signal is effectually limited for one direction of signal swing. As explained before, the other direction of signal swing is limited by action of the transistor input circuit itself.

A similar arrangement is illustrated in FIGURE 4, differing in that potential source 21 is placed in that portion of feedback path in common with output circuit **12*b*. The operation is identical with that discussed with regard to FIGURE 3, diode 22 being biased against conduction by means including potential source 21 until the drop across load 17** is sufficient to overcome the predetermined level at which the feedback path effects limiting.

Limiters constructed in accordance with the present invention find utility in a number of different applications. One such application is illustrated in FIGURE 5 which depicts a frequency-modulation radio receiver. In conventional manner, signals picked up by an antenna 40 are amplified in a radio-frequency amplifier 41 and mixed with a local oscillator signal in a converter 42 to develop an intermediate-frequency signal which is fed to an intermediate-frequency amplifier 43. In order to insure detection only of frequency modulated information, the intermediate-frequency signals are fed from amplifier 43 through a limiter 44 from which the limited signals are applied to the input of a discriminator 45 which in the normal and well understood manner detects the audio information contained in the frequency modulated signals. An audio amplifier 46 coupled to the output of discriminator 45 raises the audio signal level and applies the amplified audio signals to a reproducer 47.

As illustrated, limiter 44 is of the general type discussed above with respect to FIGURE 4. The input circuit **11*b* of limiter 44 is coupled to intermediate-frequency amplifier 43 by a transformer 50 resonant at the intermediate frequency. The input circuit is coupled between the emitter and base electrodes of transistor amplifier 10 and includes a blocking condenser 51. Output circuit 12*c* includes a load 17, a supply source comprising source 21 and supply source 19, all coupled in series between the common or emitter and output or collector electrodes. Load 17** in this instance is an intermediate-frequency transformer across which a signal voltage is developed in response to signal energy applied to the input circuit.

The feedback path includes diode 22 and potential source 21 coupled between the input or base electrode and a point in the output circuit between potential source 19 and load 17; and as in the embodiments of FIGURES 3 and 4, potential source 21 tends to bias feedback diode 22 in a non-conductive direction whereby the feedback circuit remains open until the signal swing to be limited causes a voltage drop across the output circuit load exceeding in magnitude the reverse bias on diode 22.

To improve the limiting action it is preferable that the potential developed across the total load in the output circuit be in the form of a square wave. On the other hand, as mentioned previously, for efficiency of transmission of the signals it is preferred that the tuned circuits be highly resonant so as to be capable of sustaining signals of sinusoidal wave form. This is achieved in the present instance by including a resistor 53 in the load circuit in series with load 17 and located at a point in output circuit **12*c* such that the signal voltage level measured in the output circuit by the feedback device is a square wave although the output voltage fed to discriminator 45 is sinusoidal. Hence, resistor 53 is placed solely in the output circuit between thte common emitter electrode and load 17. The usual low impedance characteristics of sources 19 and 21 are even further improved by bypassing the sources with capacitors 55 and 56**, respectively.

In operation, input signal energy tends to be amplified as soon as the input terminals of amplifier 10 are forward biased; that is, as soon as the emitter is biased in a forward direction with respect to the base. It is this forward polarity input signal swing which is limited by the action of the feedback circuit. On the other hand, input signal energy instantaneously swinging in the opposite direction tends to apply a reverse bias to the input terminals of amplifier 10 and, with no fixed bias in the input circuit, only a very small amount of signal swing in this direction is passed by the amplifier, if any. Accordingly, it is preferred to supply a fixed bias potential which applies an initial forward bias to the amplifier input. Moreover, in order to provide symmetrical amplification, this fixed bias is preferably selected to place the quiescent signal point on the amplifying characteristic of device 10 midway between the input cutoff point for signals swinging in one direction and the feedback limiting point for signals of the other polarity. To this end, the input or base electrode of amplifier 10 is connected through a high impedance resistor 58 to an adjustable tap 59 on a potentiometer 60 connected across the series combination of supply source 19 and potential source 21.

With tap 59 adjusted to place the operating point approximately midway on the available portion of the transistor amplifying characteristic, signals are not only limited equally on swings in either direction but also are amplified since the input signal is placed on the amplification characteristic in the same manner as in a normal transistor amplifier. In consequence, the arrangement takes advantage of the amplification available from device 10, and potential source 21 may be adjusted to preclude limiting until the output level reaches a considerably higher value than would otherwise be the case.

The biasing arrangement described above requires the use of blocking capacitor 51, with the disadvantage that under strong input signals, the base to emitter function of transistor 10 being reverse biased during an appreciable time, unequal amount of currents flow during positive and negative half cycles. This causes charging of capacitor 51 and an undesired modification of the working point of transistor 10. A diode 62 is placed between base and emitter of transistor 10 with a polarity such that it complements conduction of the transistor, to cause equal currents to flow during positive and negative half cycles through capacitor 51, and therefore prevent its charge up.

Signal limiters constructed in accordance with the invention have been found to be suitable over a wide range of frequencies. The limiting action usually is most precise when the voltage level measured by the feedback circuit is in the form of a square wave; when the output circuit load is a resonant circuit, this end is preferably accomplished by including a resistive impedance in series with the load. In each of the embodiments, the threshold device in the feedback circuit effectively maintains that circuit in an open condition until such time as a signal voltage in the output circuit reaches a level exceeding the threshold at which point the instantaneous output signal energy is then connected to the input circuit to limit further increase in the output signal level.

Limiting may be obtained in an otherwise ordinary transistor amplifier simply by the addition of a reference potential source and a gating device such as a diode. Consequently, the limiters of the invention are extremely simple and economical. In any of its forms, the input circuit may be biased forwardly to a point where the limiter also serves as an amplifier. The input circuit bias permits limiting symmetrically on both peaks of the signal wave. On the other hand, the input circuit may be biased to pass only signals of one voltage swing whereupon the device acts as a half-wave limiter. Since the limiting is a function of a voltage measured in circuitry external to the amplifying device, the limiter is in general unsensitive to changes in the characteristics of the amplifier device, particularly those that vary with temperature and age.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. A limiter comprising: an amplifier having input and output circuits; a signal source in said input circuit; a load in said output circuit and across which a voltage is developed in response to signal energy; a feedback path from said output circuit to said input circuit and including a Zener diode type element in series with a gating device conductive of said signal energy when said voltage exceeds a predetermined finite level; and means for biasing said gating device non-conductively at values of said voltage less than said predetermined level.

2. A limiter comprising: an amplifier having input and output circuits; a signal source in said input circuit; a first load in said output circuit resonant to signal energy from said source; a second load in said output circuit, in series with said first load, presenting an impedance non-resonant to said signal energy and across which a voltage is developed in response thereto; a feedback channel coupled at one end across said non-resonant impedance and at its other end into said input circuit; and means including a threshold device in said channel responsive to values of said voltage tending to exceed a predetermined limit for maintaining said voltage at said limit.

References Cited in the file of this patent

UNITED STATES PATENTS

| | | |
|---|---|---|
| 2,390,502 | Atkins | Dec. 11, 1945 |
| 2,472,301 | Koch | June 7, 1949 |
| 2,477,391 | Reid | July 26, 1949 |
| 2,686,259 | Koch | Aug. 10, 1954 |
| 2,885,575 | Cluwen | May 5, 1959 |